Aug. 31, 1926.  
J. CIRELLI  
1,597,671  
STREET AND STATION INDICATOR FOR PASSENGER CONVEYANCES  
Filed Oct. 22, 1925  
4 Sheets-Sheet 1

WITNESSES:  
Alfred E. Ischinger  
George A. Gruss

INVENTOR:  
John Cirelli,  
BY  
Joshua R. H. Toth  
ATTORNEY.

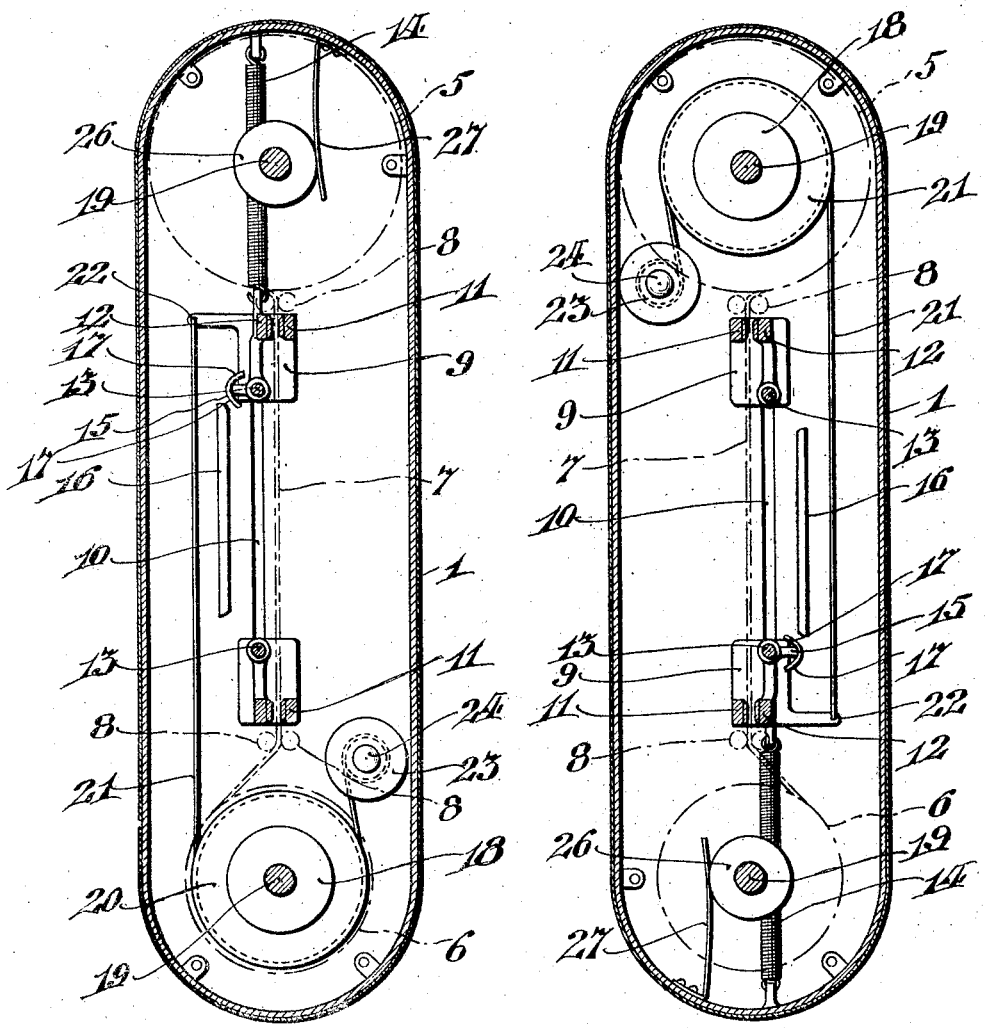

Aug. 31, 1926.

J. CIRELLI 1,597,671

STREET AND STATION INDICATOR FOR PASSENGER CONVEYANCES

Filed Oct. 22, 1925    4 Sheets-Sheet 3

WITNESSES:
Alfred E. Schinger
George A. Gruss

INVENTOR:
John Cirelli,
BY
Joshua R. H. Potts
ATTORNEY.

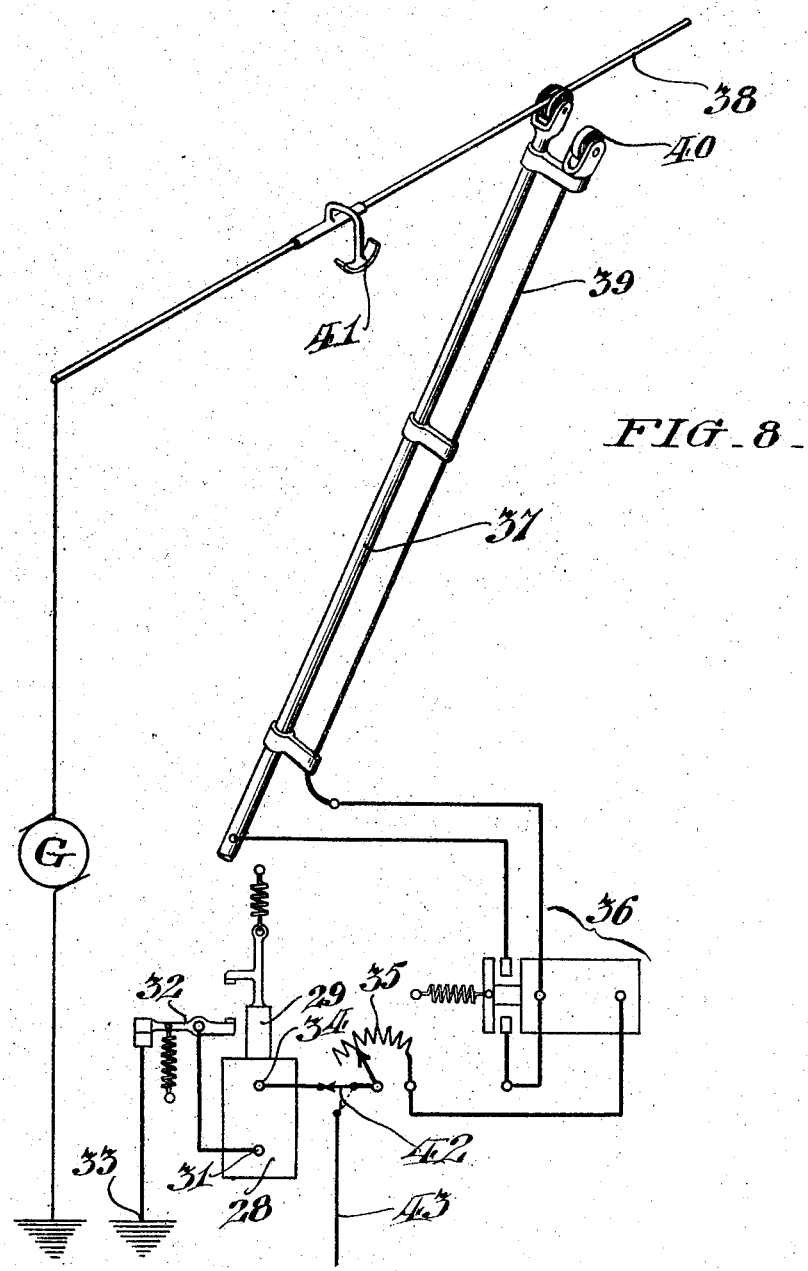

Patented Aug. 31, 1926.

1,597,671

UNITED STATES PATENT OFFICE.

JOHN CIRELLI, OF PHILADELPHIA, PENNSYLVANIA.

STREET AND STATION INDICATOR FOR PASSENGER CONVEYANCES.

Application filed October 22, 1925. Serial No. 64,122.

My invention relates to street or station indicators for passenger conveyances and is especially adapted for use in electric trains and trolley cars.

The names of streets or stations, as announced in cars are often misunderstood by passengers. Electric enunciators have been tried but have not proved successful.

In one-man trolley cars, it is essential that no duties not absolutely necessary be imposed upon the operator. Announcing streets and stations requires attention of the operator and makes safe operation more difficult.

The objects of my invention are to provide a device which will visibly indicate the stations or streets at which stops are made; which may be operated automatically, and which will accurately indicate the stops at all times.

Figure 1:
Figure 2:
Figure 5:
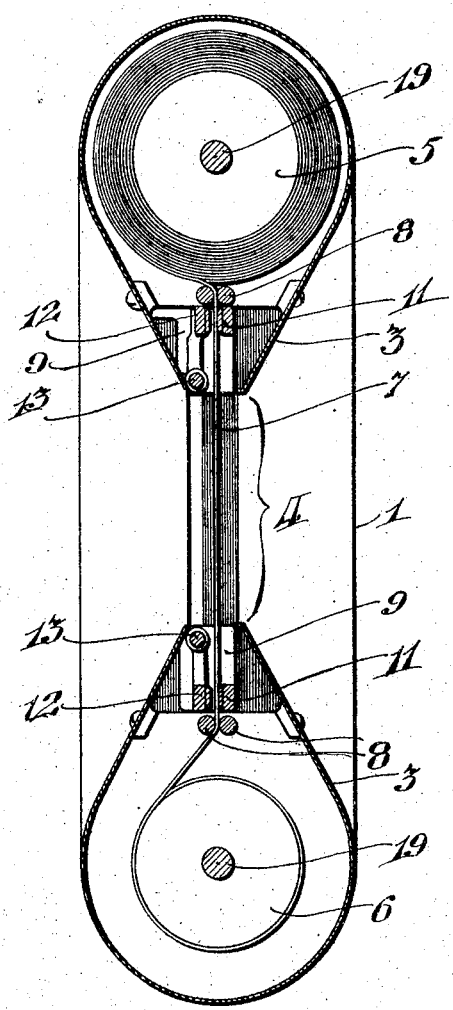
Figure 7:
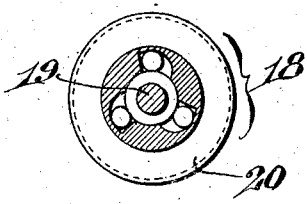
Figure 6:
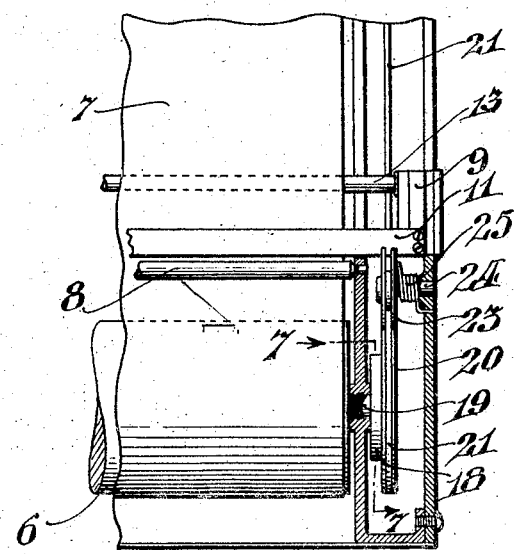

These objects, and other advantageous ends which will be described hereinafter, I attain in the following manner, reference being had to the accompanying drawings in which Figure 1 is a face view of an indicator made in accordance with my invention, Figure 2 a central vertical section through the indicator shown in Figure 1, certain of the parts being shown in full, Figure 3 an enlarged section on line 3—3 of Figure 2, Figure 4 an enlarged section on line 4—4 of Figure 2, Figure 5 an enlarged section on line 5—5 of Figure 1, Figure 6 an enlarged fragmentary view of some of the parts shown in Figure 2, Figure 7 a section on line 7—7 of Figure 6, and Figure 8 a diagrammatic view of electrical connections for automatically operating the indicator.

Referring to the drawings, 1 indicates a casing consisting of a pair of end housings 2 connected to each other by upper and lower sign enclosures 3 which leave a space 4 between them for displaying a sign. A pair of rolls 5 and 6 are disposed one in each enclosure and are rotatably mounted in the housings. A series of signs 7, preferably in sheet form, are wound on the rolls and pass from one roll to the other between guides 8 and through the space 4. The sign sheet, as it is shifted to bring a sign in displaying position in the space 4, is unwound from one roll and wound upon the other and shifted by gripping mechanism slidably mounted in the housings. Two such mechanisms are provided, one for shifting the sign in one direction and the other for shifting the sign in the opposite direction. These mechanisms being similar in construction, a description of one will suffice for both.

A pair of blocks 9 slidably mounted in guides 10 in the housings are connected to each other by a strip 11 disposed at one side of the sign sheet and hereinafter called a "stationary jaw". A movable jaw 12 disposed at the other side of the sign sheet is pivoted to the blocks at 13. These jaws are preferably lined with rubber or similar material to make a good friction contact with the sign sheet. Blocks 9 and the movable jaw 12 are held in their idle position by a coiled spring 14 connected with the upper end of the movable jaw and with the housing in such manner that it normally keeps the jaw in neutral position between its extreme gripping position and its extreme releasing position. A lever 15 on a movable jaw 12 is adapted to engage and drag along the face of a fixed member 16 on the housing, when the blocks are moved to shift the sign, and will thereby swing jaw 12, against the action of coiled spring 14, to grip the sign sheet. Curved binding faces 17 at opposite sides of the lever 15 are adapted to bind against the face of member 16 and prevent reverse movement of the blocks, if for any reason they should fail to reach the extreme end of their path of travel.

As the sign sheet is shifted by gripping and moving it between the rolls, the slack of the sheet at the winding roll is taken up and the sheet kept taut by mechanisms attached to the rolls 5 and 6. The rolls 5 and 6 and the mechanisms connected therewith are similar in construction, therefore only the mechanism on roll 5 will be described. A ratchet mechanism 18, such as shown in Figure 7, is connected with one end of a roll shaft 19, and has a grooved belt pulley 20. A belt 21 has one end connected with one of the blocks 9 at 22, passes around pulley 20 and has its other end connected on a drum 23 rotatable on a stud shaft 24 on the housing. A torsion spring 25 has one end fixed to the housing and the other end connected with the drum and is normally under tension for winding belt 21 on the drum and keeping the belt tightly against pulley 20. As blocks 9 are slid to shift the sign sheet, belt 21 is slackened and drum 23, rotated by torsion spring 25, takes up the slack and thereby rotates pulley 20, and through the ratchet mechanism transmits rotation to the roll. Upon the reverse movement of blocks 9, belt 21 rotates pulley 20 in reverse direction, the ratchet mechanism allowing free rotation of the pulley in this direction. To prevent the roll from being rotated in this reverse direction, by friction in the ratchet mechanism, I provide a friction collar 26 at the other end of roll shaft 19. Washer 26 is frictionally engaged by a strip spring 27 secured to the housing. The friction between the collar and the strip should be insufficient to prevent rotation of the roll by the belt 21 in the winding direction.

For automatic operation of the indicator, a solenoid 28, having its core 29 connected with the blocks 9, as shown at 30, has one terminal 31 through a switch 32 to the railroad tracks indicated at 33. The other terminal 34 is connected through a resistance 35 and a solenoid switch 36 to a trolley pole 37 which travels in contact with a trolley wire 38. As the trolley leaves a street or station, solenoid switch 36, normally open, is closed by energizing it with a current passed through a line 39 leading along pole 37 to a wheel 40 which engages a contact 41 mounted on trolley wire 38. After solenoid switch 36 is energized and closed, the current from trolley pole 37 will pass therethrough and keep it closed. This energizes solenoid 28 which draws in its core 29, connected with the sign shifting mechanism and thereby changes the sign. At about the same time that the sign and shifting action is completed, a projection on core 29 engages and opens switch 32. This de-energizes solenoid 28 and frees its core to outward movement produced by coiled spring 14, and also deenergizes solenoid switch 36 and allows it to open.

Assuming that the sign is mounted in a conspicuous place in a trolley car, and is electrically connected with the trolley wire, as shown in Figure 8, and the trolley car has just left a street or station. The sign will be changed to indicate the next stop when wheel 40 engages contact 41, and will remain in indicating position until the next stop is passed and wheel 40 engages another contact 41. These contacts are spaced along the trolley wire at points just past a stopping point of a car. The electrical action for changing the sign is as follows: When wheel 40 engages contact 41, an instantaneous circuit is completed through solenoid switch 36 to energize and close the same. When solenoid switch 36 is closed, a circuit is completed through trolley pole 37, solenoid switch 36 and the solenoid 28 which draws in its core 29 and slides blocks 9 to actuate the sign shifting mechanism in the indicator, as follows: As blocks 9 are slid downwardly, lever 15 is brought into engagement with the face of member 16. This causes movable jaw 12 to swing and clamp the sign sheet against the stationary jaw and thus grip the same. Upon further downward movement of blocks 9 the sign sheet will be pulled down with the jaws until they have reached the lower end of their path of travel. This brings a sign in the space 4 to indicate the next stop. When the blocks have reached the limit of their downward path, lever 15 will leave member 16 and allow coiled spring 14 to swing movable jaw 12 from the stationary jaw to release the sign. At this time switch 32 is opened by the projection on core 29 to de-energize solenoid 28 and free the core to the action of coiled spring 14. Coiled spring 14 having been stretched by the downward movement of block 9 will contract and return the blocks to their former position. During the return movement, lever 15 will engage and drag along the face of member 16 and thereby swing jaw 12 from the sign sheet to the extreme releasing position and so insure a non-engagement of the jaws with the sign sheet during the return movement of the jaws.

As the sign sheet is shifted, drum 23 which is normally under the tension of spring 25, will wind belt 21 thereon and, through the ratchet mechanism 18, cause rotation of the roll to wind the sign sheet thereon. The diameter of pulley 20 is the same as the diameter of the roll so that sufficient rotation for winding the sign on the roll is always produced. The excess movement of belt 21 over that required for rotating the roll is lost by the slipping of belt 21 on the pulley. Such slipping also allows the roll to turn in the opposite direction when the sign is unwound from the roll. As blocks 9 are returned to their former position, ratchet mechanism 18 allows free rotation of pulley 20 relatively to the roll, and the roll is held against unwinding rotation by friction roller 26 and spring 27.

If for any reason, blocks 9 should stop before reaching the end of their path of travel, a movement in the reverse direction is prevented by binding faces 17 on lever 15, which will bind against member 16 and thus hold the blocks against reverse movement. This insures that a full movement of the blocks, in shifting the sign and in returning to their former position, must be made before the blocks may move in reverse direction, and makes the indicator proof against shifting the signs improperly.

The sign is shifted in the opposite direction by connecting a two-way switch 42 with a line 43 leading to solenoid 28 of the gripping mechanism of roll 6. This solenoid is similar to the solenoid 28 of the gripping mechanism described with reference to roll 5, shown in Figure 8.

It will be seen that by shifting the sign sheet by gripping mechanism between the rolls, a uniform shifting of the sign is always insured, thus bringing the complete sign to the space 4 at all times. The sign may be easily seen by the passengers in a train or trolley car and the inconvenience caused by any uncertainty as to the next stop is avoided.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A street or station indicator including a casing; a sign sheet mounted for movement therein; blocks slidable in the casing; a stationary jaw on each of the blocks at one side of the sign sheet; a movable jaw on each of the blocks at the other side of the sign sheet; a lever on each movable jaw, members on the casing adapted to be engaged by the levers and thereby cause the movable jaw of each block to grip the sign sheet when said block is shifted in one direction and to release it when said block is shifted in the other direction.

2. A street or station indicator including a casing; a sign sheet mounted for movement therein; blocks slidable in the casing; a stationary jaw on each of the blocks at one side of the sign sheet; a movable jaw on each of the blocks at the other side of the sign sheet; a lever on each movable jaw; members on the casing adapted to be engaged by the levers and thereby cause the movable jaw of each block to grip the sign sheet when said block is shifted in one direction and to release it when said block is shifted in the other direction, and means for shifting the jaws in the opposite direction.

3. A street or station indicator including a casing; a sign sheet mounted for movement therein; blocks slidable in the casing; a stationary jaw on each of the blocks at one side of the sign sheet; a movable jaw on each of the blocks at the other side of the sign sheet; a lever on each movable jaw; members on the casing adapted to be engaged by the levers and thereby cause the movable jaw of each block to grip the sign sheet when said block is shifted in one direction and to release it when said block is shifted in the other direction, and resilient means connected with the casing and each movable jaw for shifting the jaws in the opposite direction.

4. A street or station indicator including a casing; a sign sheet mounted for movement therein; blocks slidable in the casing; a stationary jaw on each of the blocks at one side of the sign sheet; a pivoted jaw on each of the blocks at the other side of the sign sheet; a lever on each pivoted jaw; members on the casing adapted to be engaged by the levers and thereby cause the movable jaw of each block to grip the sign sheet when said block is shifted in one direction and to release it when said block is shifted in the other direction, and a spring connected with the casing and each pivoted jaw for normally keeping it between the sign gripping and sign releasing positions.

5. A street or station indicator including a casing; a sign sheet mounted for movement therein; blocks slidable in the casing; a stationary jaw on each of the blocks at one side of the sign sheet; a pivoted jaw on each of the blocks at the other side of the sign sheet; a lever on each pivoted jaw; members on the casing adapted to be engaged by the levers and thereby cause the movable jaw of each block to grip the sign sheet when said block is shifted in one direction and to release it when said block is shifted in the other direction; a spring connected with the casing and each pivoted jaw for shifting the jaws in opposite directions and for normally keeping them between the sign gripping and sign releasing positions, and means on the levers adapted to co-act with said members during the shifting of the jaws to prevent reverse movement thereof.

6. A street or station indicator including a casing; a sign sheet mounted for movement therein; blocks slidable in the casing; a stationary jaw on each of the blocks at one side of the sign sheet; a pivoted jaw on each of the blocks at the other side of the sign sheet; a lever on each pivoted jaw; members on the casing adapted to be engaged by the levers and thereby cause the movable jaw of each block to grip the sign sheet when said block is shifted in one direction and to release it when said block is shifted in the other direction; a spring connected with the casing and each pivoted jaw for shifting the jaws in opposite directions and for normally keeping them between the gripping and releasing positions, and wedging faces on opposite sides of the levers adapted to co-act with said members during the shifting of the jaws to prevent reverse movement thereof.

7. A street or station indicator including a casing; rolls rotatable in the casing; a sign sheet wound on the rolls; means slidable in the casing for engaging the sign sheet to shift the sign; ratchet mechanism connected with each roll; a flexible member connected with the sign shifting means and frictionally engaging the ratchet mechanism, and means for keeping the flexible member in frictional engagement with the ratchet mechanism during the shifting of the sign.

8. A street or station indicator including a casing; rolls rotatable in the casing; a sign sheet wound on the rolls; means slidable in the casing for engaging the sign sheet to shift the sign; ratchet mechanism connected with each roll; a pulley carried by the ratchet mechanism; a belt having one end connected with the sign shifting means and passing around the pulley, and resilient means connected with the other end of the belt for keeping it in engagement with the pulley during the shifting of the sign.

9. A street or station indicator including a casing; rolls rotatable in the casing; a sign sheet wound on the rolls; means slidable in the casing for engaging the sign sheet to shift the sign; ratchet mechanism connected with each roll; a pulley carried by the ratchet mechanism; a belt having one end connected with the sign shifting means and passing around the pulley; a drum rotatable on the casing and connected with the other end of the belt, and resilient means for rotating the drum to take up the slack in the belt during the shifting of the sign.

In testimony whereof I have signed my name to this specification.

JOHN CIRELLI.